(12) United States Patent
Dotan et al.

(10) Patent No.: US 8,752,145 B1
(45) Date of Patent: Jun. 10, 2014

(54) BIOMETRIC AUTHENTICATION WITH SMART MOBILE DEVICE

(75) Inventors: Yedidya Dotan, Tel Aviv (IL); Sorin Faibish, Newton, MA (US); Samuel Adams, Andover, MA (US); Yael Villa, Tel Aviv (IL); Robert S. Philpott, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 109 days.

(21) Appl. No.: 13/341,160

(22) Filed: Dec. 30, 2011

(51) Int. Cl.
*G06F 21/00* (2013.01)
*G06F 7/04* (2006.01)

(52) U.S. Cl.
USPC ........ 726/6; 726/4; 726/8; 382/118; 382/117; 340/5.2; 340/5.83

(58) Field of Classification Search
USPC ......... 726/4, 6, 8; 348/77, 222; 235/375, 275, 235/379; 382/115–118, 124; 713/184, 186; 340/5.2, 5.83
See application file for complete search history.

(56) References Cited

U.S. PATENT DOCUMENTS

| | | | |
|---|---|---|---|
| 7,587,610 B2 | 9/2009 | Chollet | |
| 7,685,629 B1 | 3/2010 | White et al. | |
| 7,849,501 B2 | 12/2010 | Vishik et al. | |
| 7,865,937 B1 | 1/2011 | White et al. | |
| 7,877,611 B2 | 1/2011 | Camacho et al. | |
| 8,014,570 B2 | 9/2011 | LeSaint et al. | |
| 2006/0041759 A1* | 2/2006 | Kaliski et al. | 713/184 |
| 2010/0141787 A1* | 6/2010 | Bigioi et al. | 348/222.1 |
| 2010/0299530 A1* | 11/2010 | Bell et al. | 713/186 |
| 2011/0209200 A2* | 8/2011 | Mr. White et al. | 726/4 |
| 2012/0118947 A1* | 5/2012 | Lyons et al. | 235/375 |

OTHER PUBLICATIONS

"Electronic Authentication Guideline," NIST Special Publication 800-63, William E Burr, Donna F. Dodson, and W. Timothy Polk (Apr. 2006).

* cited by examiner

*Primary Examiner* — Amare F Tabor
*Assistant Examiner* — Noura Zoubair
(74) *Attorney, Agent, or Firm* — BainwoodHuang

(57) ABSTRACT

An improved authentication technique employs a user's mobile device to obtain a picture of the user from which facial geometry is extracted and applied as part of an authentication operation of the user to the remote network. In some examples, a server stores facial geometry for different users along with associated PINs. By matching facial geometry of the user with facial geometry on the server, the user's PIN can be obtained, without the user ever having to register or remember the PIN.

19 Claims, 5 Drawing Sheets

BIOMETRIC AUTHENTICATION WITH SMART MOBILE DEVICE

BACKGROUND

Computer networks, such as those provided at a workplace, university, or other organization, are often configured to allow users to gain network access remotely through virtual private networks (VPNs), customized network settings, and/or other technologies. To gain access, users are generally required to authenticate to the remote network. Authentication may involve users providing various authentication factors, such as passwords, token codes, and personal identification numbers (PINs). Remote networks generally include, or have access to, an authentication server. The authentication server receives authentication requests from users and either grants or denies access, based on whether authentication factors provided with the requests match expected values. For added security, networks often require that multiple authentication factors be entered and verified before access can be granted.

A common two-factor authentication scheme involves both a token code and a PIN. The token code, also known as a one-time password, or "OTP," is generated automatically, such as by a portable device that a user has in his or her possession. The PIN is a number, or possibly an alpha-numeric string, that the user has memorized. Both the token and the PIN have been registered previously in connection with the user at the authentication server. The user enters both the token code and the PIN in one or more fields of a network login screen on the user's computer. Access to the remote network is only granted to the user's computer if both the token code (something the user has) and the PIN (something the user knows) can be verified. An example of a portable token is SecureID®, which is available from RSA Security Inc. of Bedford, Mass.

Recently, software has been introduced to perform the functions of tokens on smart mobile devices, such as smart phones, PDAs, and tablets. In one example, a user of a computer wishing to access a remote network enters his or her PIN into a field displayed on the user's mobile device. The mobile device sends the PIN to an authentication server. If the PIN matches an expected value, the authentication server sends back a signal to unlock the mobile device to allow the mobile device to display a token code. The user can then transfer the token code manually to the computer to enable the computer to gain access to the remote network.

SUMMARY

PINs can be used alone or in combination with token codes or other factors to afford a high level of security. Unfortunately, however, PINs can be inconvenient. For example, users need to register their PINs. Registration usually entails the user visiting a website or other online resource. The user may have to answer questions and is sometimes asked to follow additional procedures to ensure safe delivery of the PIN. The user may be required to respond to an email message or even wait for a PIN to arrive via postal service, before registration can be completed. Registration can therefore be time consuming. In addition, PINs can be forgotten. Users who have forgotten their PINs generally need to re-register and therefore become subject again to time consuming procedures.

Ironically, PINs can sometimes compromise security. Users often need to provide PINs for many different applications. Users may write down their PINs in presumably safe locations, but malicious parties can sometimes discover and steal the PINs. If a user decides to use only a single PIN for different applications, in an effort to avoid having to remember multiple PINs, the chance that the PIN will be stolen increases. The effects that ensue after a PIN is stolen can be far reaching, as a single stolen PIN may afford malicious access to multiple applications.

An improved authentication technique avoids the inconvenience and potential security risks associated with conventional PINs by employing the user's mobile device to obtain live, picture information of the user and using the picture information as part of an authentication operation of the user to the remote network. In some examples, a server stores picture information for different users along with associated PINs. By matching picture information from a user's mobile device with picture information held on the server, the user's PIN can be obtained, without the user ever having to register or remember the PIN.

In some examples, picture information is obtained from pictures of users and stored on a picture server. The pictures of users may be taken conveniently when the users obtain ID cards from the company or other organization that owns or uses the remote network. For each user, the picture server associates the user's picture information with a unique PIN. When the user later wishes to access the network remotely, the user can take a picture of him or herself with a camera on the user's mobile device. The mobile device obtains picture information from the picture. In some examples, the picture information is simply a file or other collection of data that stores the picture, such as a BMP, JPG, GIF, and so on. In other examples, the picture information is data extracted from the picture, such as facial geometry data obtained by identifying multiple facial landmarks, such as the size, shape, and/or position of facial features. In any of these examples, the picture information is sent to the picture server. The picture server compares the picture information with picture information previously stored. In some examples, if a match is found, the picture server sends the PIN corresponding to the matching picture information to the user's mobile device. The user can then log onto the remote network in the conventional way, such as by copying the PIN and a soft token code generated by the mobile device into one or more fields of a computer login screen. In other examples, rather than sending a PIN to the mobile device, the picture server instead sends an UNLOCK command, which permits the mobile device to display a soft token code that would otherwise be kept hidden from the user. The user can then enter the soft token code into a field of a login screen on the user's computer to logon to the remote network.

In some examples, one or more safeguards are applied to ensure that the picture of the user is a live picture of the actual user and not simply a photograph or video. The risk that access to the network can be gained by a malicious party having only a picture or video of an authentic user is therefore avoided.

Using the above-described technique, picture information of a user is employed to access a PIN or other authentication factor. The inconvenience of registering and remembering PINs is therefore avoided, as are the security risks that can arise if PINs are lost, stolen, or otherwise disclosed.

BRIEF DESCRIPTION OF THE SEVERAL VIEWS OF THE DRAWINGS

The foregoing and other features and advantages will be apparent from the following description of particular embodiments of the invention, as illustrated in the accompanying drawings in which like reference characters refer to the same parts throughout the different views. In the drawings.

DETAILED DESCRIPTION

An improved authentication technique employs a user's mobile device to obtain live, picture information of the user and applies the picture information as part of an authentication operation of the user to a remote network.

Particular embodiments will now be disclosed. It is understood that these embodiments are included by way of example only and are not intended as limiting the manner in which the invention hereof may be practiced.

Figure 1:
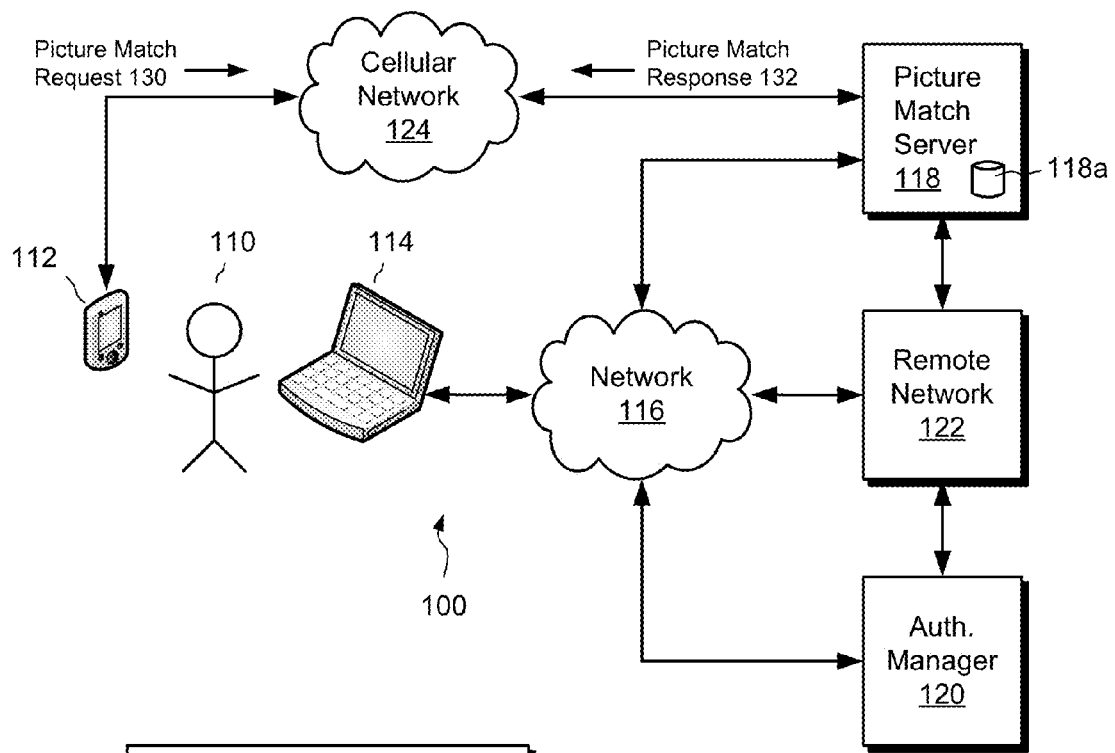
FIG. 1 is a block diagram of an example system for performing authentication with the aid of picture information obtained from a mobile device.

FIG. 1 shows an example environment 100 in which enhanced authentication techniques employing facial recognition may be conducted. The environment 100 includes a human user 110, a mobile device 112, and a computing device 114. The mobile device 112 is coupled to a cellular telephone network 124, and the computing device 114 is coupled to a network 116, such as the Internet. Also coupled to the network 116 are a picture match server 118, an authentication manager 120, and a remote network 122. The picture match server 118 is also preferably coupled to the cellular network 124.

The mobile device 112 is generally a smart phone, such as an iPhone, Blackberry, Droid, or a similar device; however, the mobile device 112 can be any smart device equipped with a camera and a network connection, which is capable of communicating over the network and running software.

The computing device 114 is the device employed by the user 110 to accesses resources on the remote network 122. The computing device 114 is therefore generally a computer, such as a desktop or laptop computer. This is not critical, however, and the computing device 114 can be any type of computing device, including a tablet computer or even a smart phone or other mobile device itself.

The picture match server 118 and authentication manager 120 are preferably separate servers. They may be included within the remote network 122 or provided outside the remote network 122. Although the picture match server 118 and authentication manager 120 may be combined on a single computer, they are preferably maintained on physically separate computers, or even on separate networks, for enhanced security.

Figure 2:
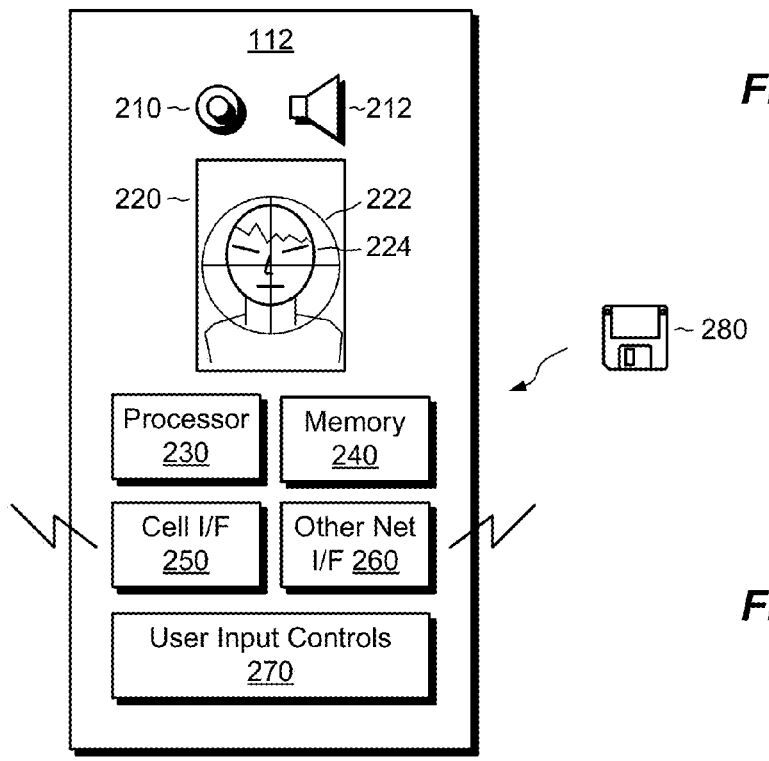
FIG. 2 is a block diagram of an example mobile device as shown in FIG. 1.

FIG. 2 shows an example mobile device 112. The mobile device 112 includes a camera 210, a speaker 212, and a display area 220. The mobile device 112 also generally includes a processor 230, memory 240, a cell interface 250, e.g., for communicating wirelessly over the cellular network 124, and another network interface 260, e.g., for communicating wirelessly over the network 114. User input controls 270, such as buttons and/or a touchpad are also included to allow the user 110 to enter data, such as numbers, letters, and other characters, into the mobile device 112. The mobile device 112 runs program code including a security application (e.g., an "app"). The app is used to acquire and process pictures of the user 110 and to provide a soft token code that the computing device 114 uses to access the remote network 122. The app is stored in the memory 240 and is executed on the processor 230.

When running the app on the mobile device 112, the user 110 sees an image 224 of himself or herself on the display 220, enabling the user to take a picture. Also, the app preferably displays an indicator 222. The indicator is superimposed on the image 224 of the user 110 and designates where the user should position his or her face on the display 220 for best photographic results. If the mobile device 112 is equipped only with a rear-facing camera, the mobile device 112 may alternatively generate an audible signal from the speaker 212, which directs the user to properly position his or her face relative to the field of view of the camera 210. The audible signal can take a number of forms, such as beeps issued as the user's face becomes properly aligned, and spoken instructions to direct the user to adjust the camera position, e.g., "left," "right," "up," and "down."

To initiate an authentication request to the remote network 122, the user 110 opens an application on the computing device 114 to start a VPN program. The application presents a log-in screen that displays fields into which the user 110 is directed to enter information, such as the user's user ID, a SecureID® token code, and a PIN, for example. The user 110 then accesses the mobile device 112 and starts the app. The app directs the user 110 to take a picture. The user 110 points the camera (or one of the cameras, where there are more than one) at his or her face and takes a picture. The app on the mobile device 112 processes the picture and extracts facial geometry from the image of the user's face.

The facial geometry may include a large number of reference points, or landmarks, from which the relative size, shape, and position of facial features may be computed. The greater the number of landmarks acquired, the greater the uniqueness of any individual's facial geometry. Previous work has shown that facial geometry is highly specific to each individual, and the chance of any two individuals, other than identical twins, having the same, or even closely matching, facial geometry is very low. Facial geometry is stored in the mobile device 112 in the form of a data set, which may be provided in a single file, such as a bitmap.

With the picture taken and the facial geometry extracted, the mobile device 112 sends a picture match request 130 to the picture match server 118. The picture match request 130 includes the facial geometry acquired for the picture just taken, as well as a direction for the picture match server 118 to compare the facial geometry with records of facial geometry stored on the picture match server 118.

The picture match server 118 includes a database 118a. The database 118a of the picture match server 118 can be constructed in any suitable way, but generally includes a different record for each user of the remote network 122. Each record stores, for example, the following fields:

a. an identifier of the user (e.g., an employee number or organization-issued ID number);
    b. an identifier of the user's mobile device (e.g., an IMSI code)
    c. the user's PIN; and
    d. a set of facial geometry previously obtained from a picture of the user.

Most large companies and many organizations require users to obtain photo ID cards. In one example, facial geometry for populating the database 118a can be extracted conveniently from these photo ID cards, at no additional burden to users. In other examples, facial geometry for users may be obtained by other means, such as by separately photographing users or by having users photograph themselves with their own mobile devices and register their pictures with the picture server 118.

The picture match server 118 compares the facial geometry conveyed with the picture match request 130 with one or more records of facial geometry stored in the database 118a to determine whether there is a match, i.e., whether the facial geometry of the user substantially matches the facial geometry associated with the user, or with any of the users, whose facial geometry is stored in the database 118a. The picture match server 118 then issues a picture match response 132, which is sent back to the mobile device 112, preferably via the cellular network 124. The picture match response, which can include a PIN, a command, or other information, can then be used as part of an authentication operation by the user 110 to provide the computing device 114 with access to the remote network 122.

Preferably, the picture match request 130 is sent to the picture match server 118 via the cellular network 124. Although the mobile device 112 may support other networks, such as the network 116, the cellular network 124 is generally preferred for sending the picture match request 130, as the cellular network 124 is separate from the network 116 and thus provides an added measure of security (e.g., a malicious user on the network 116 monitoring the computing device 114 would not necessarily also be monitoring the same cell phone network 124 and coordinating traffic from the two sources).

FIGS. 3-6 show examples of various processes for authenticating the user 110 to the remote network 122 by applying facial geometry acquired with the mobile device 112. The various acts of each process may be ordered in any suitable way. Accordingly, embodiments may be constructed in which acts are performed in orders different from those illustrated, which may include performing some acts simultaneously, even though the acts are shown as sequential in the illustrated embodiments. Also, it is understood that these processes are presented merely as examples and are not intended as an exhaustive or limiting set of options.

Figure 3:
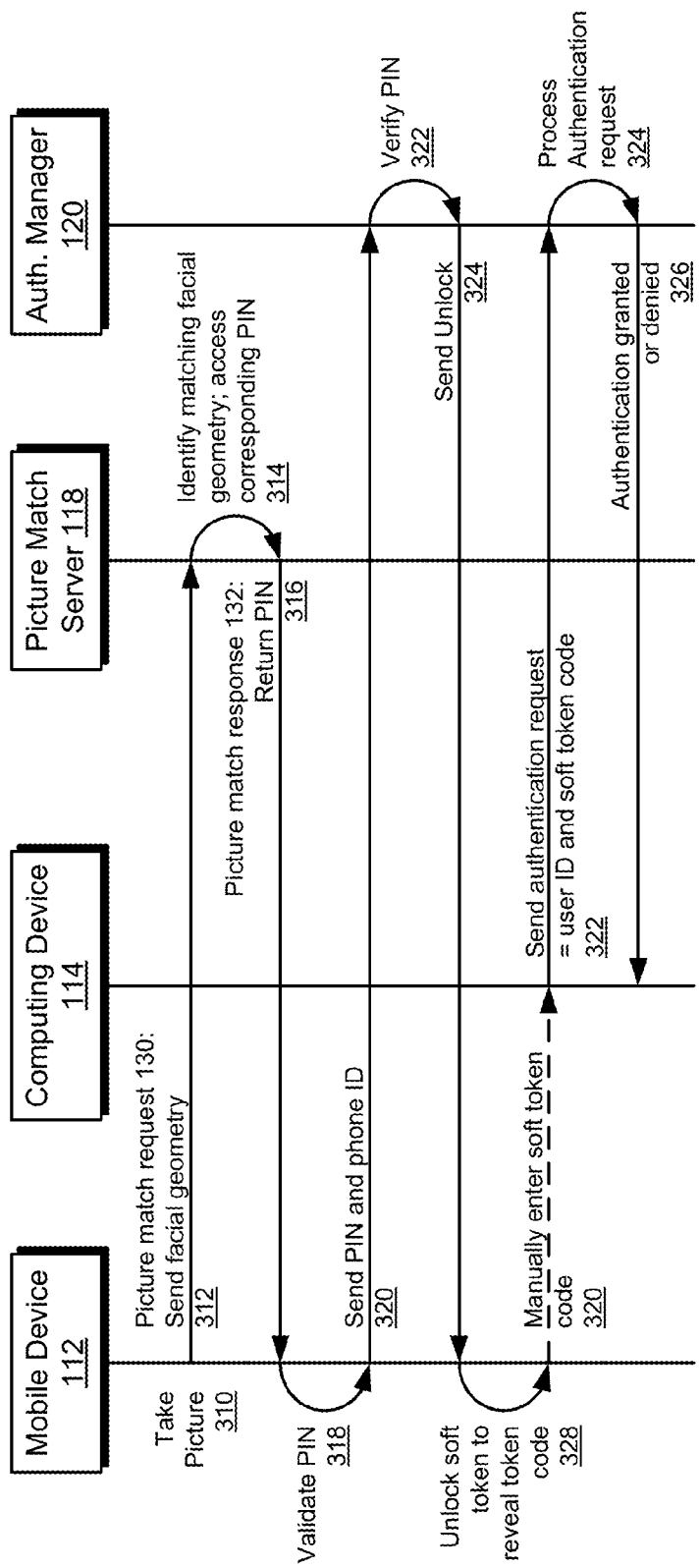
FIG. 3 is a sequence diagram showing an example sequence for authenticating a user to a remote computing network using picture information to unlock a soft token on the mobile device.

FIG. 3 shows an example process for using biometric information to unlock the app running on the mobile device 112, causing the app to display a soft token code to the user 110, which the user can apply to the computing device 114 to access the remote network. This process is similar to the prior process, which required the user to manually enter a PIN to unlock a mobile device. In this case, however, the user is not required to enter a PIN. Rather, the user takes a picture of him or herself and the PIN is entered automatically.

The process begins at event 310, with the user 110 starting the security app (described above) on the mobile device 112 and taking a picture of himself or herself. The mobile device 112 processes the picture and extracts the user's facial geometry from the picture. At event 312, a picture match request 130, which includes the facial geometry, is sent to the picture match server 118. The picture match server 118 compares the facial geometry from the picture match request 130 with one or more records of facial geometry stored in the database 318a (event 314). The picture match server 118 then sends a picture match response 132 back to the mobile device 112 (event 316). If a match is found, the picture match response 132 includes the PIN the stored in the database 118a in connection with the user 110. The PIN may be, a long PIN, i.e., one that includes more than the usual number of characters. If no match is found, the picture match response 132 includes a message indicating that authentication is denied.

Once the user's PIN arrives at the mobile device 112, the app proceeds to validate the PIN. At event 320, the PIN is sent to the authentication manager 120, along with an ID of the phone, such as an IMSI code. At event 322, the authentication manager 120 verifies that the PIN and the phone ID belong to the same user and sends an UNLOCK command to the mobile device (event 324). Upon receiving the UNLOCK command, the app running on the mobile device 112 displays a previously hidden soft token code on the display 220 of the mobile device 112 (event 328).

At event 320, the user 110 manually enters the soft token code just displayed on the mobile device 112 and the user's user ID into the login screen on the computing device 114. At event 322, the computing device 114 submits an authentication request to the authentication manager 120. The authentication manager 120 receives the request and, at event 324, performs an authentication operation, applying the user ID and soft token code provided. At event 326, the authentication request is granted or denied.

It can be seen from the above that the process depicted in FIG. 3 is similar to the prior art technique described above, except that, rather than entering a PIN to unlock the soft token code, the user instead takes a picture of him or herself, whereupon the user's PIN is obtained automatically and used to unlock the soft token code on the user's behalf. The user is therefore not required to enter a PIN or even to remember a PIN. In some examples, the user is not required to register a PIN, either, and the PIN is instead generated by the authentication manager 120 and/or the picture match server 118 without involvement of the user.

Figure 4:
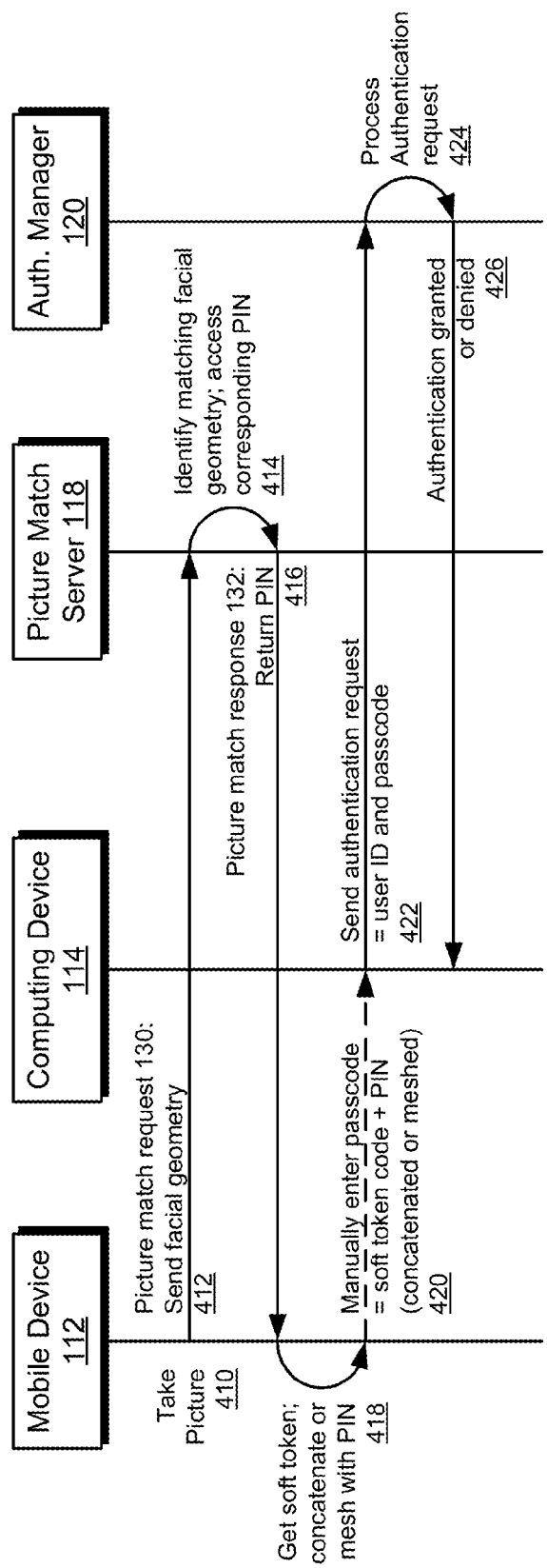
FIG. 4 is a sequence diagram showing an example sequence for authenticating a user to a remote computing network using picture information to obtain a PIN, wherein the PIN is combined with a token code to produce an authentication passcode.

The process shown in FIG. 4 can be simplified. For example, the picture match server 118, rather than sending a PIN back to the mobile device 112, can instead send an UNLOCK command directly. The mobile device 114 can then display a token code upon receiving the UNLOCK command, and events 318, 320, 322, and 324 can be omitted. According to this variant, verification of the PIN is performed by the picture match server 118, rather than by the authentication manager 120 as is usually the case.

FIG. 4 is a sequence diagram showing another use case. In the sequence of FIG. 4, the picture match server 118 sends a PIN back to the mobile device 112 to be combined with a soft token code to form a passcode.

At event 410, the user 110 takes a picture of himself or herself and the mobile device 112 extracts facial geometry. At event 412, a picture match request 130 is sent to the picture match server 118. The picture match request 130 includes the extracted facial geometry. At event 414, the picture match server 318 identifies a match (if there is one). The picture match server 318 accesses the database 318a, identifies the PIN associated with the matching facial geometry, and returns the PIN to the mobile device 112 in the picture match response 132. At event 418, the mobile device 112 combines the soft token code with the PIN and displays the combined result to the user 110 via the display 220. The soft token code and the PIN can be combined in various ways. In one example, the soft token code is simply concatenated with the PIN to form a passcode. For instance, a 6-digit soft token code is concatenated with a 4-digit PIN to produce a 10-digit passcode. In another example, the soft token code and the PIN are meshed together to form a passcode, i.e., a meshing algorithm is applied to blend the soft token code and the PIN together.

At event 420, the user 110 manually copies the passcode displayed on the mobile device 112 into the login screen of the VPN application running on the computing device 114. At event 422, the user 110 submits an authentication request from the computing device 114, including the user's user ID and the passcode. At event 424, the authentication manager 120 receives and processes the authentication request. The authentication manager 120 separates the passcode into its constituent soft token code and PIN. For meshed passcodes, the authentication manager 120 applies a de-meshing algorithm to reverse the effects of the meshing algorithm above. At event 426, authentication is either granted or denied.

Figure 5:
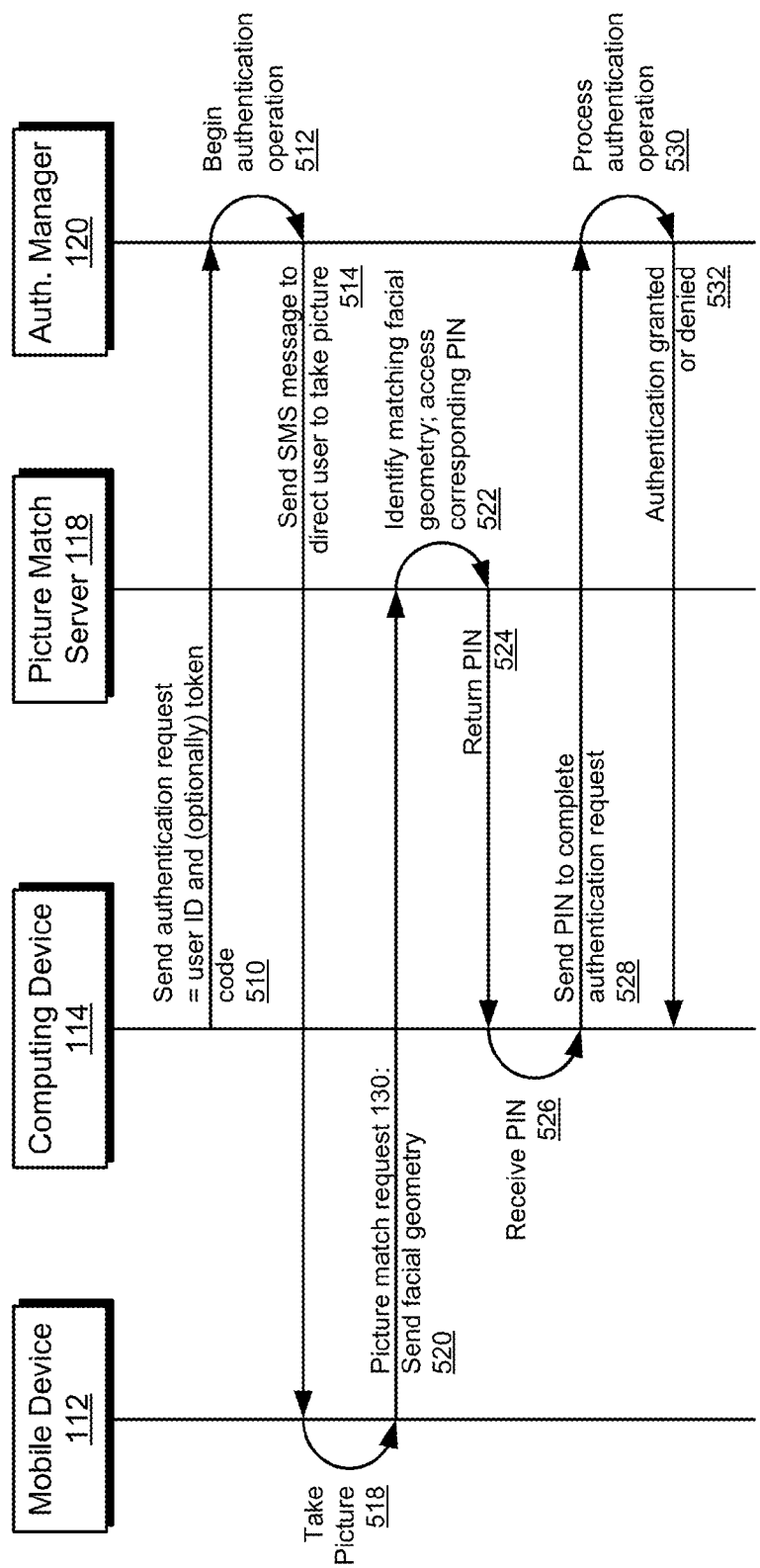
FIG. 5 is a sequence diagram showing an example sequence for authenticating a user to a remote computing network in a partially automated fashion using picture information.

In providing for the use of passcodes that include combinations of token codes and PINs, the use case of FIG. 5 fits readily with existing authentication techniques that employ passcodes (e.g., SecureID® authentication techniques). The existing techniques are improved, however, in that they require a facial recognition match before they release the user's PIN to the mobile device 112.

FIG. 5 is a sequence diagram showing a use case involving SMS messaging. The process for this example generally begins with the computing device 114. At event 510, the user 110 accesses a login screen from the VPN application on the computing device 114. The user typically enters the user's user ID and a token code. The token code is acquired either from a soft token running on the mobile device 112 (as in the previous examples) or from another type of token, such as a SecureID® key fob. The user 110 then submits the entered information to provide a partial authentication request.

At event 512, the authentication manager 120 receives the partial authentication request and begins an authentication operation. The authentication manager 120 identifies a mobile device phone number associated with the user ID received (e.g., from a database—not shown—of the authentication manager 120). The authentication manager 120 then sends and SMS message (i.e., a text message) to the mobile device 112. The text message instructs the user to launch the security app and take a picture of him or herself. At event 518, the user starts the security app on the mobile device 112 (assuming it is not running already) and takes the picture. The mobile device 112 extracts the facial geometry. At event 520, the mobile device 112 sends a picture match request 130, including the facial geometry, to the picture server 118. At event 522, the picture match server 118 searches the database 118a for a match. If a match is found, the picture match server identifies the PIN for the user in the database 118a, whose facial geometry matches the facial geometry provided with the picture match request 130.

At event 524, the picture match server 118 sends a response, not to the mobile device 112, but to the computing device 114. The response includes the user's PIN. At event 526, the computing device 114 receives the PIN and forwards the PIN to the authentication manager 120, thereby completing the authentication request begun at event 510. At event 530, the authentication manager 120 finishes performing the authentication operation by validating the PIN. If validation is successful, authentication is granted; otherwise, it is denied (event 532).

The use case of FIG. 5 has the advantage of never sending the PIN to the mobile device 112. The user 110, therefore, does not need to know the PIN or even know that there is a PIN. The PIN can be assigned by the picture match server 118 and/or the authentication manager 120, without user involvement. The user 110 therefore needs neither to remember a PIN, nor to enter a PIN, nor to register a PIN.

Figure 6:
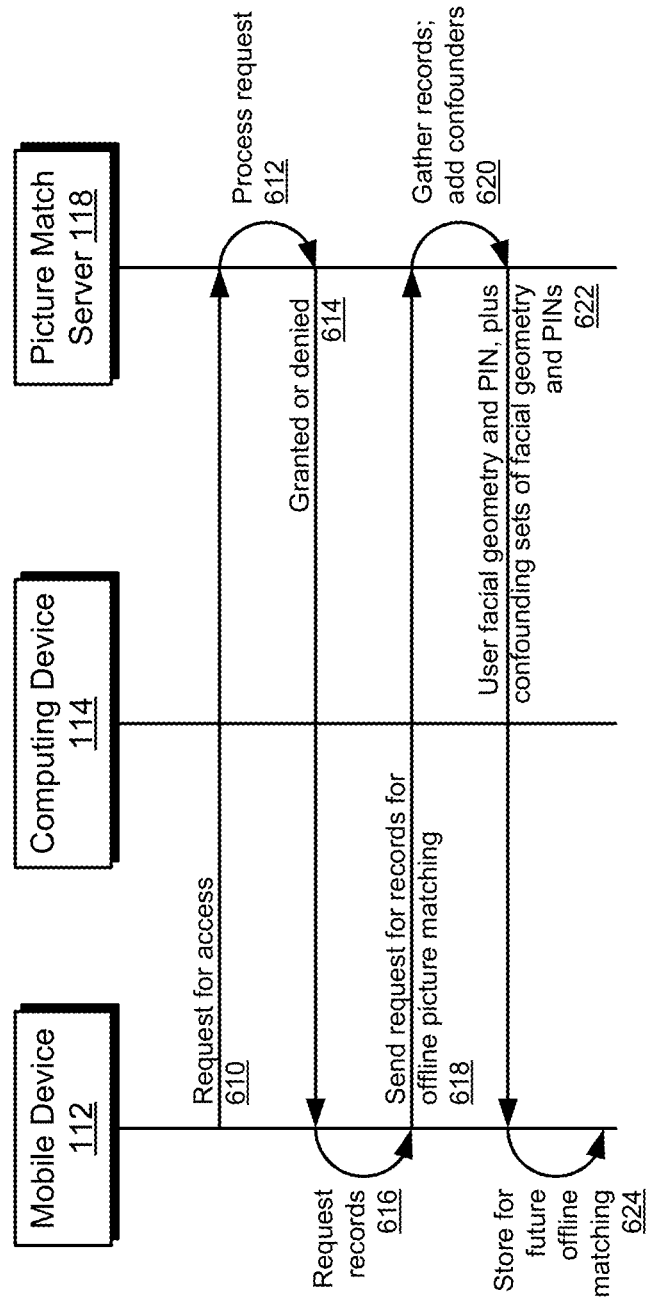
FIG. 6 is a sequence diagram showing an example sequence for providing the mobile device of FIGS. 1 and 2 with the user's PIN and previously stored picture information about the user, as well as confounding information, for enabling the user to use picture information to authenticate to the remote computing network even when the mobile device is disconnected from a network.

FIG. 6 is a sequence diagram showing still another use case. The use case of FIG. 6 pertains to preparing the mobile device 112 for off-line authentication. The process seeds the mobile device 112 with a set of records from the database 318a and creates, in effect, a local picture match server within the mobile device 112. The local picture match server enables the mobile device 112 to authenticate the user 110 of the computing device 114 to the remote network 122 even when the mobile device 112 is disconnected from the cellular network 124. A situation that calls for this type of authentication commonly arises on an airplane, for example, where the user 110 has WIFI access but no cellular telephone service.

The process of FIG. 6 may begin at event 610, when the mobile device 112, acting through the security app, sends a request for access to the picture match server 118. The request may include authentication information, such as the phone ID and facial geometry data of the user 110 (i.e., the user 110 may be prompted to take a picture). At event 612, the picture match server 118 processes the request. At event 614, the request is either granted or denied.

Assuming the request is granted, the app on the mobile device 112 requests multiple records at event 616. The request is sent to the picture match server 118 (event 618). The picture match server 118 gathers a set of records from the database 118a for transmission back to the mobile device 112 (event 620). The set of records includes the record for the user 110, as well as records for other users. The records for other users are preferably fictitious records, i.e., they do not correspond to any actual users but are instead included simply as confounding data intended to confuse malicious eavesdroppers. Also, certain fields of the database 118a, such as employee ID, are preferably omitted, since they serve no purpose in this process and should not be gratuitously transmitted over public networks.

At event 622, the collected set of records is sent back to the mobile device. Each record includes a set of facial geometry for the user designated in the record (of which only the facial geometry of the user 110 is preferably valid) and the respective user's PIN. At event 624, the mobile device 112 receives the set of records and stores the records for local matching at a later time. The mobile device 112 preferably creates an internal, local version of the picture match server 118, which it can use in place of the picture match server 118 for offline matching.

Subsequently, when the user's mobile device 112 is offline and the user 110 wishes to log onto to VPN, the app on the mobile device 112 can use the local version of the picture match server in place of the picture match server 118, and proceed to authenticate to the remote network 122 using any of the authentication processes described in connection with FIGS. 3-5 above.

Each of the use cases described above avoids the need for the user 110 to remember a PIN. In some of the use cases (e.g., those of FIGS. 3 and 5), the user 110 never comes in contact with the PIN or even necessarily knows that a PIN exists. The inconvenience and security hazards associated with PINs are therefore reduced or eliminated.

It is understood that the above-described matching of facial geometry does not require exact matching. Owing to different lighting conditions, different cameras, different moods of the user, and photographic variations, matching between the facial geometry from the mobile device 112 and facial geometry in the database 318a is almost never expected to be exact.

Preferably, the picture match server 118 uses fuzzy logic to compare facial geometry. The fuzzy logic can operate in many ways. In one example, the fuzzy logic identifies a degree of similarity between the user's facial geometry and one or more sets of facial geometry stored in the database 118a. A threshold is defined, above which the degree of similarity is deemed sufficient to establish a match. Below the threshold, the degree of similarity is deemed insufficient to establish a match. A wide array of fuzzy logic techniques may be employed. These include, for example, multivariate analysis of variance, modified TF-IDF (term frequency, inverse document frequency), SVD (single value decomposition), non-linear least squares QR decomposition, and vector comparisons. The foregoing list is not intended to be exhaustive. Many different techniques can be applied, as would be understood by those skilled in the art.

To improve precision, facial geometry from different pictures of the user 110 can be averaged. For example, the mobile device 112 can be programmed to automatically take a sequence of pictures of the user 110 in rapid succession. Facial geometry is extracted for each picture, and the different data sets of facial geometry are averaged together. The averaged facial geometry is then sent to the picture match server 118 for ascertaining a match.

In some examples, the picture match request 130 specifies a user ID or other identifier. In these cases, the picture match server 118 is required to perform only a single fuzzy logic comparison, i.e., to compare the facial geometry included with the picture match request 130 with the facial geometry corresponding to the user ID in the database 318a. In other examples, the picture match request 130 does not specify a user ID or other identifier. In those cases, the picture match server 118 compares facial geometry from the picture match request 130 with each set of facial geometry in the database 118a, until a match is found or all records have been examined.

The app running on the mobile device 112 is preferably equipped with safeguards to ensure that the picture of the user 110 is authentic. These safeguards operate to prevent a malicious user from gaining unauthorized access to the remote network 122 by using the mobile device 112 to take a picture of a photograph or video of the user 110. A variety of safeguards may be used.

In one example, the camera 210 on the mobile device 112 is directed to take a sequence of pictures of the user at high frequency and to search for small, rapid changes in the user's skin color. These changes correspond to the user's pulse, with small changes alternatively toward red and blue at the proper frequency indicating the ebb and flow of oxygenated blood. If the sequence of pictures reveals this variable coloration pattern, the subject of the picture is most likely a living being as opposed to a picture.

Another safeguard monitors infra-red light emitted by the subject of the picture. Although infra-red light is generally regarded as an undesirable side effect of electronic photography, infra-red light can be used to advantage in verifying picture authenticity, as human faces, and not pictures of human faces, give off infrared light in a known pattern.

Yet another safeguard applies geographic information about the user 110. It is common for mobile devices to track their geographic locations. Geographic location can be used as a safeguard to refuse authentication attempts if the mobile device 112 reports that it is outside its home country or state, or even if it is in some unexpected location.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, although the examples described above employ facial geometry, other forms of biometric information can be used. These include voice information and fingerprint information, for example. Rather than the mobile device 112 taking a picture of the user 110, the mobile device 112 can instead obtain a fingerprint or voice sample of the user 110, which it converts to a data set for comparison with data sets stored in connection with different users in the database 318a.

Also, although the mobile device 112 is described as a general-purpose device, such as a smart phone, PDA, tablet, and the like, it can also be a special purpose device, such as a key fob modified to include a camera, a processor, and memory. According to yet another variant, the mobile device 112 is itself a computer, such as a laptop computer. In some embodiments, the mobile device 112 can be the same as the computing device 114.

Also, although the security program running on the mobile device 112 is specified as being an "app," this is merely an example. The program can be any software construct running on the mobile device 112.

Although the examples described herein involve the use of VPN to access the remote network 122, this is also merely an example. The techniques described can be used in connection with a wide range of other technologies, such as web technology, remote desktop programs, and others.

Further, although the above-described techniques use the mobile device 112 to extract facial geometry from a picture of the user, this is just an example. Alternatively, a file or data stream representing the picture itself can be sent to the picture match server 118, and the picture match server 118 can extract the user's facial geometry remotely.

Also, although the PIN is described as an independent field of the database 118a, alternatively, the PIN may be computed from the facial geometry. For example, it can be a hash code of the facial geometry.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 280 in FIG. 2). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method for authenticating a user to a remote computing network, comprising:
acquiring a picture of the user with a camera of a mobile device;
obtaining picture information from the picture of the user;

sending the picture information to a server that stores picture information in connection with different users of the remote computing network;
receiving a picture match response back from the server, the picture match response indicating whether the picture information from the picture matches the picture information stored on the server; and
using the picture match response as part of an authentication operation of the user to the remote computing network,
wherein receiving the picture match response includes receiving an UNLOCK instruction from the server, and wherein the method further comprises the mobile device displaying, in response to receiving the UNLOCK instruction, a soft token code to the user for accessing the remote computing network, and
wherein the mobile device has a display and the method further comprises:
showing an image on the display corresponding to objects toward which the camera is pointing; and
superimposing an indicator on the image, the indicator showing the user where to place the user's face relative to the image when acquiring the picture.

2. The method as in claim 1, wherein sending the picture information includes directing the server to compare the picture information from the picture with picture information stored in different records of a database of the server, wherein each record of the database of the server stores picture information previously acquired from a picture of a respective user of the remote computing network and a personal identification number (PIN) associated with the respective user of the remote computing network.

3. The method as in claim 2, wherein receiving the picture match response from the server includes receiving the user's PIN, and wherein the method further includes:
generating a soft token code; and
displaying the soft token code to the user,
wherein the soft token code combined with the PIN form a passcode for accessing the remote computing network.

4. The method as recited in claim 3, further comprising applying a meshing algorithm to combine the soft token code with the PIN to form the passcode for accessing the remote computing network.

5. The method as recited in claim 2, wherein each record of the database further stores a respective mobile device identifier associated with a mobile device of the respective user, and wherein the method further comprises:
receiving, from the server, at least a partial record of the database associated with the identifier of the mobile device, the record including the picture information and the PIN associated with the mobile device of the user; and
receiving multiple additional records each including a PIN that does not correspond to any valid user PIN but that is included as confounding information.

6. The method as recited in claim 2,
wherein acquiring picture information from the picture of the user includes extracting facial geometry pertaining to the user's facial features, and
wherein the picture information stored with each record of the database on the server includes facial geometry pertaining to the respective user's facial features.

7. The method as recited in claim 6, further comprising:
acquiring additional pictures of the user;
extracting facial geometry pertaining to the user's facial features for each of the additional pictures; and
averaging facial geometry obtained from the picture and the additional pictures to produce averaged facial geometry.

8. The method as recited in claim 6, further comprising:
comparing the facial geometry extracted from the picture with the facial geometry stored in the database in association with at least one user; and
verifying a successful match if the degree of similarity between the facial geometry extracted from the picture and the facial geometry stored in the database exceeds a predetermined threshold.

9. The method as recited in claim 8, wherein comparing the facial geometry includes applying a fuzzy logic technique including one of (i) a multivariate analysis of variance, (ii) a non-linear least squares QR decomposition, (iii) an inverse document frequency (IDF) analysis; and (iv) a single value decomposition (SVD).

10. The method as recited in claim 1, further comprising, prior to acquiring the picture, receiving a Short Message Service (SMS) transmission from an authentication manager of the remote computing network directing the user to take the picture.

11. The method as recited in claim 1, wherein the mobile device includes a cellular telephone, wherein the picture information is sent to the server via a cellular telephone network, and wherein the picture match response is received from the server via the cellular telephone network.

12. The method as recited in claim 1, further comprising issuing an audible signal to indicate when the user's face is positioned relative to a field of view of the camera to permit including the user's facial features in the picture.

13. The method of claim 1, wherein the acts of sending the picture information to the server and receiving the picture match response back from the server are performed by the mobile device.

14. The method of claim 13, further comprising acquiring multiple pictures and comparing them to detect changes in skin color indicative of the object of the picture having a pulse.

15. The method of claim 13, further comprising detecting infrared light emitted by the object of the picture to confirm that the object is warm.

16. The method of claim 13, further comprising running a soft token generator on the mobile device, wherein the soft token generator generates the soft token code and the mobile device displays the soft token code generated by the soft token generator running on the mobile device in response to receiving the UNLOCK instruction from the server.

17. A mobile device for authenticating a user to a remote computing network, comprising:
memory for storing program code;
a processor, coupled to the memory, for running the program code;
a camera coupled to the processor; and
a network interface, coupled to the processor,
wherein the processor running the program code is constructed and arranged to—
acquire a picture of the user with the camera;
obtain picture information from the picture of the user;
send, via the network interface, the picture information to a server that stores picture information in connection with different users of the remote computing network;
receive, via the network interface, a picture match response back from the server, the picture match response indicating whether the picture information from the picture matches the picture information stored on the server; and use the picture match response as part of an authentication operation of the user to the remote computing network, wherein the processor running the program code is further constructed and arranged to— receive the picture match response by receiving an UNLOCK instruction from the server, and display, in response to receiving the UNLOCK instruction, a soft token code to the user for accessing the remote computing network, and wherein, when constructed and arranged to acquire a picture of the user with the camera, the processor running the program code is further constructed and arranged to:

show an image on a display of the mobile device, the image corresponding to objects toward which the camera is pointing; and superimpose an indicator on the image, the indicator showing the user where to place the user's face relative to the image when acquiring the picture.

18. The mobile device as recited in claim 17, further comprising a display, wherein the processor running the program code is further constructed and arranged to— show an image on the display corresponding to objects toward which the camera is pointing, and superimpose an indicator on the image, the indicator showing the user where to place the user's face relative to the image when acquiring the picture.

19. A non-transitory computer-readable medium including instructions which, when executed by a mobile device, cause the mobile device to perform a method for authenticating a user to a remote computing network, the method comprising:

acquiring a picture of the user with a camera of a mobile device;

obtaining picture information from the picture of the user;

sending the picture information to a server that stores picture information in connection with different users of the remote computing network;

receiving a picture match response back from the server, the picture match response indicating whether the picture information from the picture matches the picture information stored on the server; and using the picture match response as part of an authentication operation of the user to the remote computing network, wherein receiving the picture match response includes receiving an UNLOCK instruction from the server, and wherein the method further comprises the mobile device displaying, in response to receiving the UNLOCK instruction, a soft token code to the user for accessing the remote computing network, wherein the method further comprises:

showing an image on a display of the mobile device, the image corresponding to objects toward which the camera is pointing; and superimposing an indicator on the image, the indicator showing the user where to place the user's face relative to the image when acquiring the picture.

* * * * *